United States Patent [19]

Kononenko et al.

[11] 4,123,568
[45] Oct. 31, 1978

[54] METHOD OF MANUFACTURING AN IRON ELECTRODE FOR ALKALINE ACCUMULATORS

[76] Inventors: Viktor Evmenievich Kononenko, poselok Akkumulyator, 31, kv. 7; Valentina Nikolaevna Tamazina, ulitsa Radischeva, 71/1, kv. 20; Alla Ivanovna Ozerova, ulitsa Vtoraya Rabochaya, 2/41, kv. 28, all of Kursk, U.S.S.R.

[21] Appl. No.: 691,887

[22] Filed: Jun. 1, 1976

[51] Int. Cl.$^2$ .................... H01M 4/04; H01M 4/26
[52] U.S. Cl. .................... 427/126; 29/623.5; 427/58; 427/372 R; 429/221; 429/236; 429/241
[58] Field of Search .................... 427/58, 372 R, 126; 429/221, 236, 241; 141/1.1; 29/623.5

[56] References Cited

U.S. PATENT DOCUMENTS

| | | | |
|---|---|---|---|
| 3,450,571 | 6/1969 | Zenczak | 427/11 |
| 3,725,129 | 4/1973 | Ruzzo | 141/1.1 |
| 3,905,829 | 9/1975 | Yehuda | 427/58 |
| 3,918,989 | 11/1975 | Gillman | 141/1.1 |
| 3,947,292 | 3/1976 | Jackovitz | 429/221 |
| 4,021,911 | 5/1977 | Kononenko et al. | 429/221 |

*Primary Examiner*—John D. Smith
*Attorney, Agent, or Firm*—Lackenbach, Lilling & Siegel

[57] ABSTRACT

A method for manufacturing an electrode for an alkaline accumulator by applying an active mass to a metallic grid such as iron which includes preparation of an active mass comprising a black iron ore concentrate, iron oxide, synthetic fibre, ferrous technical iron, an aqueous solution of nickel sulfate, a surface active agent, and an aqueous solution of polyvinyl alcohol, said polyvinyl alcohol being heated prior to addition with a dehydrating agent such as a concentrated sulfuric acid in a ratio of 1:5 of sulfuric acid to polyvinyl alcohol. The resulting active mass is rubbed into a grid made of a steel band, and dried for 15 to 20 minutes at a temperature of from 110° to 180° C until the dehydration of polyvinyl alcohol corresponds to 25–30 mol.% of double bonds.

1 Claim, No Drawings

METHOD OF MANUFACTURING AN IRON ELECTRODE FOR ALKALINE ACCUMULATORS

The proposed invention relates to manufacturing accumulators, and more specifically, to a method of manufacturing an iron electrode for alkaline accumulators which can be used in electrotechnics, in the automobile industry and in other areas as sources of electric current.

Known in the art is a method of manufacturing a lamellar electrode for nickel - iron batteries (cf. Mechanization of storage batteries production, G.G. Drachyov, U.P. Galuzin, Energiya, Leningrad, 1969) which consists in manufacturing the negative electrode by reducing a mixture of ore concentrate and iron oxide by one of the known reducing agents, e.g., iron powder, at high temperature to ferrous oxide.

The active mass of the negative electrode consists of a mixture of metallic iron and iron oxides to which nickel sulphate and ferrous sulphate are added in small quantities, graphite being introduced therewith as an electric conducting substance.

The active mass in the form of powder is pressed into a lamella steel grid. The lamellar electrodes are embodied as a set of lamella flat boxes made of a punched steel band and filled with the active mass. The lamellas are coupled forming an electrode, the butt ends of the lamellas are closed by shaped ribs. The function of the lamella is to prevent the active mass from crumbling away. The manufacture of lamellar electrodes is a laborious process, while the use of the active mass in the form of powder creates a dust problem.

Besides, the carrying portion of the electrode, the grid and the ribs constitute about half of the electrode's weight and a considerable portion of its volume. All this metal is not involved in electrochemical reactions, that is, this metal is inert material. The working conditions of the active mass contained in a punched shell are unfavorable in many respects, the area of the openings provided in the punched lamella constitute only 5- 8%. This impedes the access of electrolyte inside the electrode resulting in reduced electric characteristics of the electrode and of the accumulator as a whole.

The provision of a lamellaless electrode is a problem of great practical interest.

Known in the art is a method of manufacturing a lamellaless cadmic electrode (Japan Patent 66,369, filed 17545/71 Class HOI m, Matsusita Denki Sanchyo K.K. company/.

The method consists of introducing an electrical conducting substance and a resin, such as polyvinylchloride, which serves as a binder, into the active mass of the electrode. Prior to that, the polyvinylchloride is mixed with a liquid, e.g. tetrahydrofurane in which polyvinylchloride is not soluble, and also with a liquid like ethyleneglycol, in which polyvinylchloride is also not soluble. The active mass is then mixed with the obtained fluid mass and is applied to the metal grid and then dried.

However, the introduction of a chemically inert binding polyvinylchloride into the active mass causes a considerable shielding of the mass, the active iron utilization factor being sharply decreased therewith.

It is possible that particles are washed out and slime is formed, which promotes short circuits.

Owing to partial insulation of the active mass caused by polyvinylchloride the possibilities of reducing the backing of active cadmium per unit ampere-hour are limited.

The manufacture of a glue composition of polyvinylchloride involves use of toxic organic solvents, e.g. tetrahydrofuran, said feature considerably impairing labor conditions.

There is known one more method of manufacturing an electrode (cf. Japanese Patent No. 175 44/71 Matsusita Denki Sanchyo K.K. Co.).

According to this method an activated powder, e.g. cadmium oxide, is mixed with a coal powder, then acetylene black is added, as well as a liquid mixture of glycol and polyvinyl alcohol heated to 120° C. The mixture is thoroughly mixed and applied on an iron grid holder from both sides. Glycol is evaporated during drying and then electrochemical formation of the electrode is accomplished in two charge-discharge cycles. After washing and drying, the electrode is used in an alkaline storage battery. Addition of the coal powder increases discharge characteristics of the electrode, because it increases its electric conductivity in a stable and uniform way as compared to addition of powders of various metals.

This method has the following drawbacks: liberation of noxious gases of glycol and heating of solutions containing glycol at high temperatures. The polyvinyl alcohol is not a strengthening component because in the above mentioned conditions it does not become water or alkali resistant and, therefore, during the operation of alkaline accumulators the polymer is washed out. Thus, introduction of polyvinyl alcohol according to this method achieves only better diffusion characteristics of electrodes.

Owing to the above disadvantages, which become particularly evident as the iron electrodes are manufactured and operated, it is not advisable to use the above method for manufacturing an iron electrode.

Known in the art is a method for manufacturing an iron electrode for alkaline accumulators, which was developed before the present method, consisting of introducing an aqueous solution of surface-active substances in amounts of 3- 20 weight parts relative to the weight of dry components into the active mass composed of black iron ore concentrate, iron oxide, synthetic fibre, ferrous technical sulphate and an aqueous solution of nickel sulphate, after which the active mass is rubbed into a steel band grid and dried for 5-10 minutes at a temperature of 150°-300° C. After that the obtained electrode is treated with a binder, which is composed of 15-20% lithium hydroxide suspended in 20% solution of epoxy resin in an organic, curing agent-doped solvent, and then the electrode is dried.

This method makes it possible to obtain electrodes of sufficient strength and improved electrical characteristics, the weight of the electrode is reduced by one half. Besides, the backing of iron per unit ampere-hour is reduced by 30%.

However, the proposed method does not exclude use of organic solvents, which cause evolution of noxious gases as the electrodes are being dried.

It is an object of the invention to provide a smeared-on iron electrode for alkaline accumulators with increased electrical and strength characteristics relative to those lamellar and lamellaless iron electrodes known in the art, and to improve labor conditions of manufacturing electrodes by eliminating the necessity of organic solvents and other toxic reagents and by reducing certain process operations.

The above object is attained by the proposed method of manufacturing a smeared-on iron electrode, wherein an active mass admixture composed of black iron ore concentrate, iron oxide, synthetic fibre, ferrous technical sulphate, aqueous solution of nickel sulphate and surface-active substances are mixed with a 5% aqueous solution of polyvinyl alcohol into which, for example a concentrated sulfuric acid, is introduced subsequent to warming-up at a temperature of 60° for 1.5 – 2 hours. The obtained composition of the active mass is smeared into a steel band grid and then is dried for 15–30 minutes at a temperature of 110°–180°.

The essence of the method of manufacturing the smeared-on electrode consists in that the process is started from manufacturing a backing by cutting and stretching a steel band material in longitudinal rows; the cuttings and stretching in all the longitudinal rows are carried out concurrently with 1 – 3 notches being made in each row and notches in adjacent rows being displaced in steps. Then an active mass is smeared into said backing, which is composed of a mixture of black iron ore concentrate /$Fe_3O_4$,-95 weight parts, iron oxide /$Fe_2O_3$/- 5 weight parts, synthetic fibre - 0.1 – 0.2 weight parts, ferrous technical sulphate ,FeS,-1.05 – 1.25 weight parts, aqueous solutions of nickel sulphate - 12.5 weight parts and of surface-active substances ,SAS, — 9 weight parts, and also of 5% aqueous solution of polyvinyl alcohol ,PVA, - 2 weight parts, into which subsequent to being warmed-up at the temperature of 60° during 1.5 -2 hours a strong sulfuric acid ,$H_2SO_4$, is introduced in the proportion 1 to 5 polyvinyl alcohol.

The electrode obtained by above method is dried at a temperature of 110° – 180°.

As the solution of the polyvinyl alcohol with a dehydrating admixture - strong sulfuric acid is introduced in the course of heat treatment the degree of dehydration of the polyvinyl alcohol reaches 26 – 30 mol. percent of double bonds, the latter providing for required properties of the hardening film-elasticity, electric conductivity, mechanical strength, water and alkali resistance at elevated temperatures.

In this way, the use of aqueous solutions of polyvinyl alcohol with a dehydratating admixture as a binder ensures a reliable adhesion between the particles of the active mass and between said particles and the grid. This reduces the number of process operations, provide for safer working conditions by excluding the need for organic solvents, reduces manpower, and reduces the cost of the electrode 2.5 times relative to lamellar and manufactured by backing electrodes. At the same time, the water permeability of the control film composed of dehydrated polyvinyl alcohol allows for reducing the backing of iron per unit ampere - hour by 35 – 40%, reducing the weight of the electrode by one half, while the service life and reliability of accumulators increases.

What is claimed is:

1. A method of manufacturing an electrode for an alkaline accumulator by applying on to a grid made of a steel band, a mass consisting essentially of a mixture of black iron ore concentrate, $Fe_3O_4$, in the amount of 95 parts by weight, iron oxide, $Fe_2O_3$, in the amount of 5 parts by weight, synthetic fibre in an amount of 0.1 to 0.2 parts by weight, FeS, in the amount of 1.05 to 1.25 parts by weight, aqueous nickel sulfate in the amount of 12.5 parts by weight, a surface active agent in the amount of 9 parts by weight, and adding an aqueous solution of polyvinyl alcohol in the amount of 2 parts by weight mixed with concentrated sulfuric acid in a weight ratio of 1 to 5 with respect to said polyvinyl alcohol, wherein said parts by weight refer to the total mass, rubbing the resulting activated mass into said grid and drying for 15 to 30 minutes at a temperature within the range of from 110° to 180° C.

* * * * *